United States Patent Office 3,357,196
Patented Dec. 12, 1967

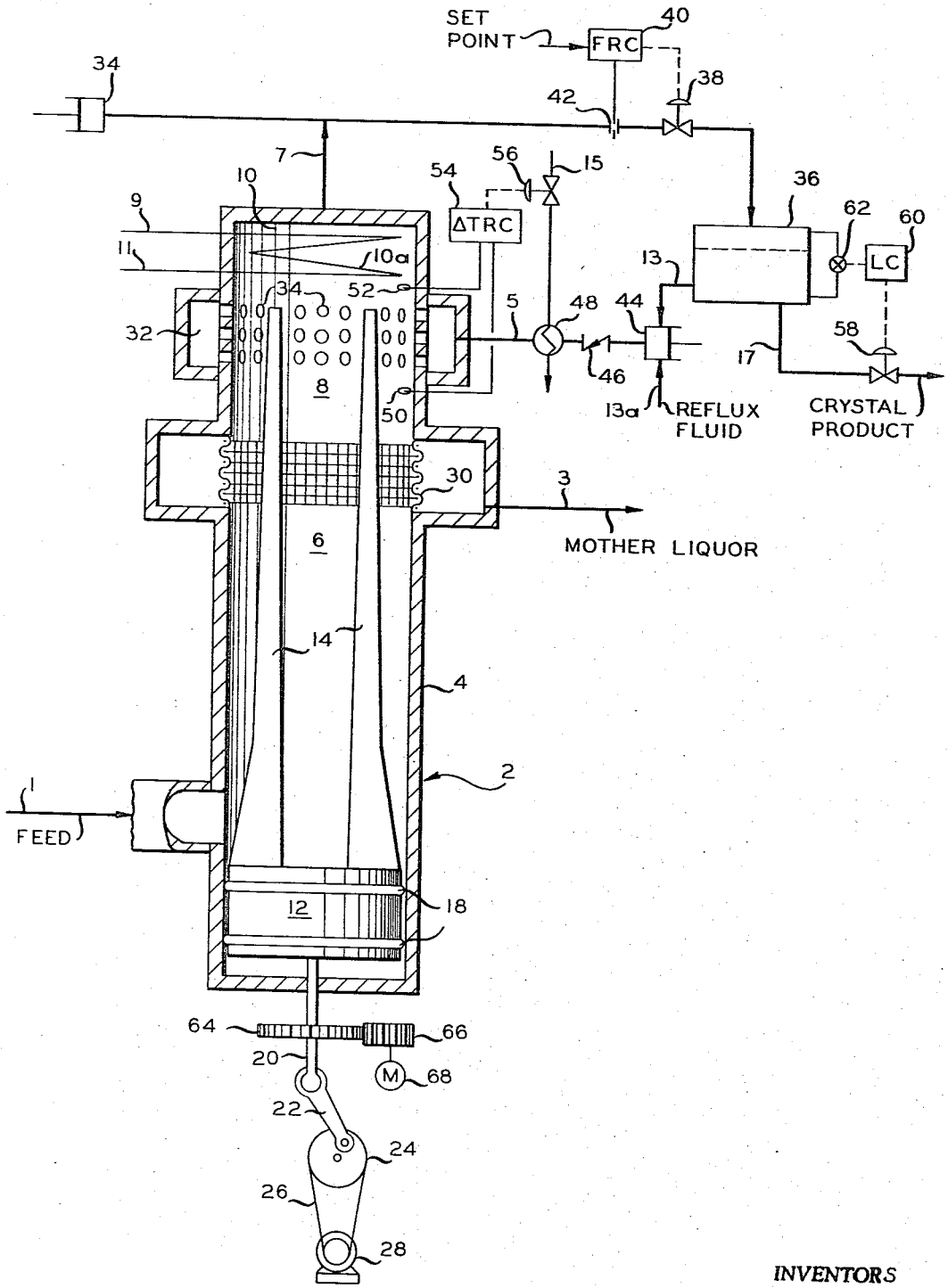

3,357,196
HEATED MELT RECYCLE RESPONSIVE TO TEMPERATURE DIFFERENTIAL OF CRYSTAL MASS
Dennis L. Dutcher, Bartlesville, Okla., and Philip G. Kirmser, Manhattan, Kans., assignors to Phillips Petroleum Company, a corporation of Delaware
Filed Jan. 13, 1965, Ser. No. 425,134
14 Claims. (Cl. 62—58)

ABSTRACT OF THE DISCLOSURE

Separation of components from a liquid mixture containing at least two components by fractional crystallization including externally recycling a portion of the withdrawn melt as reflux and controlling the temperature of the external reflux fluid to maintain a constant temperature differential across the crystal mass. Additionally, the crystal mass is compacted by the application of an intermittent mechanical force.

---

This invention relates to crystallization separations.

Purification by means of fractional crystallization has been known for a number of years. Schmidt, Re. 23,810 (1954) discloses a process and apparatus for the purification of crystals, which process involves moving a mixture of crystals and adhering liquid through a liquid removal zone, a reflux zone and into a melting zone, removing liquid in said liquid removal zone, melting crystals in said melting zone, withdrawing part of the melt as product and forcing the other part of the melt in a direction countercurrent to the movement of crystals in said reflux zone. The crystal mass is moved through said zones in packed condition by means of a piston reciprocating in said zones. Thomas, U.S. 2,854,494 (1958), discloses a process and apparatus for effective separation by fractional crystallization at high throughput rates, improved stability and ease of operation, improved heat distribution, and production of high purity products over long range periods of operation. In this patent solids are countercurrently contacted with a reflux liquid in a purification zone, the solids in said zone being contacted with an intermittent flow of reflux liquid simultaneously with a propulsion of the solids through said zone. The countercurrent, intermittent flow of reflux liquid with the solids is obtained by applying a pulsating pressure to the melt in the purification column. These processes are generally applicable to the separation of at least one pure component from any mixture which is resolvable into its components by fractional crystallization. For example, the processes can be used for the concentration of fruit juices, vegetable juices, beer, wine, and other materials which comprise aqueous solutions which can be concentrated by the formation of ice crystals and removal thereof in the form of water. The pulsations are also of great value in the resolution of non-aqueous mixtures, an example of such an application being the separation of paraxylene from a mixture thereof with the other xylene isomers and ethyl benzene.

In the operation of crystal purification columns, a slurry of crystals and mother liquor is passed from a chiller into a prefilter section of the column and then through a filter zone wherein a portion of the mother liquor is removed through the filter, leaving a crystal bed containing 60 to 75 percent solids. It is highly desirable that the solids content of the crystal bed be held constant at high levels because (1) transport of the bed through the reflux zone to the melt zone is made easier; and (2) channeling of reflux liquid through the bed is reduced, therby keeping purity of the melt product at high levels. After the mother liquor is removed from the crystals in the filter zone, the crystals pass to a reflux zone and then to a melt zone wherein the crystals are melted and the liquid therefrom removed as a pure product.

In the past it has been suggested to introduce a reflux liquid to the crystal mass in the reflux zone from an external source. Such introduction of a fluid externally to the crystal mass can cause operational problems within the column. The variations in temperature imparted to the crystal mass by the external reflux liquid create a nonuniform crystal bed which results in channeling of the crystal mass. Another factor effecting channeling of the crystal mass is the compaction of the crystal mass as it moves through the purification column.

We have now discovered an improved method and apparatus for use with and in crystal purification apparatus to provide improved compaction and refluxing of the crystal mass. Furthermore, we have found a method of controlling the temperature of the liquid reflux material introduced externally to the crystal mass which controls the temperature gradient in the mass of crystals to prevent channeling thereof.

Accordingly, it is an object of our invention to provide an improved method for the operation of crystal purification processes and apparatus.

Another object of our invention is to provide an improved method and apparatus for compacting a crystal bed in a crystal purification apparatus.

Still another object of our invention is to provide method and means for controlling the temperature of the crystal bed in a crystal purification apparatus.

Other objects, aspects and advantages of our invention will be apparent to those skilled in the art from further study of this disclosure, the accompanying drawing, and appended claims.

Broadly, our invention provides improved compaction of a crystal mass in the column by use of a piston oscillating in said column, the piston having a plurality of probes extending therefrom and contacting the crystal mass. In operation of a column with our improved compaction means, the crystal mass is compacted by applying mechanical forces directly to the mass of crystals which compacts additional feed crystals thereto with each application of force. In combination with the improved compaction of the crystal bed, our invention provides for improved refluxing of the thus compacted crystal mass by introducing reflux to the crystal mass from an external source. The external reflux admitted to the crystal mass is controlled to prevent channeling of the crystal mass by a $\Delta$ temperature measurement taken across the mass which manipulates the temperature of the external reflux being admitted.

The forces applied to the mass in accordance with this invention will depend to some extent on the material being processed and the quantity of solids entering the column. Also, the force may be applied completely over the crystal mass by a piston having a like diameter, as well as being applied by a plurality of probes. The force may be applied in an area of from 2 to 100 percent that of the crystal mass. The stroke of the piston and/or probes will generally be from ½ to 12 inches, preferably 1 to 5 inches, depending upon the length of the column and crystal mass. The frequency of the strokes will be within the range of about 1 to about 100 per minute, preferably from 5 to 20 per minute. The quantity of force applied in this manner can range up to about 1000 pounds per square inch. The piston and/or probes can be rotated within the range of 0 to 100 r.p.m., preferably 1 to 10 r.p.m. during operation.

Our invention is applicable to the resolution of a vast number of simple binary and complex multicomponent mixture systems by fractional crystallization processes and apparatus. Particularly, such systems are hydrocarbons which have practically the same boiling points and are very difficult to separate by distillation. Where the hydrocarbons are high-boiling organic compounds, separation by crystallization is required because of such compounds being unstable at distillation temperatures. Examples of nonaqueous mixtures include combinations of benzene, normal heptane, carbon tetrachloride, ethyl alcohol, cyclohexane, methyl cyclohexane, toluene, chloroform, acetone, paraxylene, other xylene isomers, ethyl benzene, and the like. Our invention is also applicable to the fractional crystallization separation wherein it is desirable to recover mother liquor from the crystals as a product of the process. This situation arises where it is desired to increase concentration of the dilute solution. For example, the invention is applicable to the production of concentrated fruit products which involves primarily removal of water from these products, such as removing water from fruit juices such as grape, orange, lemon, pineapple, apple, tomato, and the like, and other concentrations of vegetable juices and other beverages such as milk, beer, wine, coffee, tea, and the like.

Our invention will now be more fully described with reference to the accompanying drawing which is a partial cross-sectional diagrammatic representation of a fractional crystallization column which includes the features of our invention.

Referring now to the drawing in detail, a slurry of crystals and mother liquor formed from a chilling zone, not shown, is introduced through conduit 1 into purification column 2. Purification column 2 comprises housing 4 having an inlet communicating with conduit 1, a mother liquor outlet 3 located in a filter zone area 6 positioned downstream from the feed inlet, external reflux conduit inlet 5 communicating with reflux zone 8 located downstream of filter zone 6, and liquefied crystal outlet 7 communicating with melt zone 10 located downstream from reflux zone 8. Within housing 4 of purification column 2 is positioned piston 12 having a plurality of probes 14 extending therefrom in a direction downstream of the column through the filter zone and into the reflux zone. Two probes 14 are shown on the piston; however, it is to be understood that one or a plurality of probes may be employed. Piston 12 is reciprocally moved within housing 4. Rings 18 prevent leakage of fluid by the piston. Piston 12 is motivated by connecting rod 20 extending from piston 12 through housing 4 and connected by ball and socket means to drive shaft 22 operatively connected to cam 24 driven by belt 26 and motor 28. A hydraulic cylinder may also be used to reciprocate the piston. Piston 12 and probes 14 are rotated in housing 4 by gear means 64 rigidly attached to connecting rod 20. Gear means 64 is driven by meshing with gear means 66 driven by motor 68. Filter one 6 of column 2 comprises an enlargement of housing 4 with filter screen 30 positioned thereabout. Reflux zone 8 has an enlargement about housing 4 to define a manifold chamber 32. The external reflux from conduit 45 enters manifold chamber 32 and enters reflux zone 8 through a plurality of openings 34 in housing 4 of reflux zone 8. Heating means 10a shown as a heat exchange coil, is positioned in melt zone 10. Heat exchange coil 10a has inlet conduit for the heat exchange medium 9 and outlet conduit 11. Operatively connected to conduit 7 is pulse unit 34 for supplying pulses to the melted crystals, thus causing backflow thereof from the melt section to the reflux section to create a degree of refluxing of the crystal mass. The melted crystal material removed in conduit 7 is passed to accumulator 36. The flow of crystal melt passing through conduit 7 is controlled by valve 38 positioned in conduit 7. Valve 38 is manipulated by a signal from flow recorder controller 40 obtained by a signal from flow sensing means 42 in conduit 7 and a desired flow rate introduced to flow recorder controller 40 as a set point. Reflux liquid from accumulator 36 is introduced through conduit 13 to reciprocating pump 44 and thence through conduit 5. Reciprocating reflux pump 44 and pulse pump 34 are operated 180° out of phase. Extraneous reflux fluid can be introduced through conduit 13a as reflux for the crystals. This fluid can be used in addition to or in place of the fluid in conduit 13. When concentrating aqueous systems, pure water can conveniently be used as the extraneous reflux fluid. Check valve 46 is positioned in conduit 5 to prevent backflow of reflux liquids from reflux zone through conduit 5. The reflux liquid from pump 44 passes through heat exchanger 48 prior to entering chamber 32 about reflux zone 8. The temperature of the reflux liquid in conduit 5 is controlled by regulating the flow of heat exchange fluid through heat exchanger 48. Temperature probes 50 and 52, located at opposite sides of the crystal bed within purification column 2, send signals to A temperature recorder controller 54 which produces a signal which manipulates valve 56 in conduit 15 introducing heat exchange medium to heat exchanger 48. Crystal product liquid is withdrawn from accumulator 36 through conduit 17. The quantity of product removed through conduit 17 is controlled by valve 58 positioned in conduit 17. Valve 58 is manipulated by a signal from liquid level controller 60 operatively connected to and receiving a signal from liquid level transmitter 62 positioned on accumulator 36.

*Example*

Beer containing 3.5 weight percent alcohol is passed at a rate of 75 gallons per hour into a 6-inch diameter, 20-foot long scraped-surface chiller. Ammonia is evaporated in a jacket surrounding the chiller at 10° F. thus cooling the beer to 26.8° F. thereby forming an effluent containing about 50 percent ice crystals. This effluent is introduced through conduit 1, shown in FIGURE 1, to a 6-inch diameter crystal purification column. The column comprises a pre-filter section 4, 90 inches long; a filter zone 6, 12 inches long; a reflux zone 8, 24 inches long; a reflux introduction zone 32, 12 inches long; and a melt zone 10, 9 inches long. A pulse unit 34 communicating the column melt outlet has a 6 cubic inch displacement and operates at about 360 cycles per minute. Water at 180° F. is introduced into heating coil 10a, thus melting the ice crystals. The ice melt, water of about 99.9 weight percent purity, is removed through conduit 7 at a rate of about 57.5 gallons per hour at about 88° F. The beer concentrate containing about 7.0 weight percent alcohol is removed from the filter section of the column through conduit 3 at the rate of about 37.5 gallons per hour. Positioned in pre-filter section 4 is a piston 12 having 6 compaction probes extending from the piston through the column evenly spaced apart and each tapering from 2 x ½ inches at the piston to ½ x ½ inch at the opposite ends. The piston and probes have a combined length of 114 inches, a stroke of about 2½ inches, and operated at about 10 strokes per minute. The piston and probes are rotated at 6 r.p.m. by gear and motor means 64, 66 and 68 as shown in the drawing. Pure water at 40° F. is introduced at a rate of about 20 gallons per hour by reciprocating pump 44 operating at about 360 cycles per minute, 180° out of phase with pulse unit 34, through conduit 5 to reflux introduction zone 32. The reflux establishes a temperature gradient of 12° F. in the crystal bed as indicated by thermocouples reading 42° and 30°. If the temperature gradient decreases below 12° F. controller 54 opens valve 56 permitting more heating fluid to pass through exchanger 48 to raise the temperature of the pure water reflux. Accordingly, if the temperature gradient increases valve 56 is further closed thus reducing the heating of the water reflux. The use of the piston and probes provide for compaction of the crystal bed to a greater degree than obtainable with other columns. The use of the temperature gradient controlled external reflux introduction to the improved compacted crystal bed reduces channeling through the bed and permits greater throughput through the column with higher purity water removed as product than is obtainable with other columns.

The piston and probes of this invention will generally be operated at from 1 to 20 strokes per minute and have a length of a fraction of an inch to 4 inches per stroke. The size of the probes and the contacting surface thereof, the ends, will have a cross-sectional area proportional to the size of the crystal bed and column being employed. Generally, the probes will have an end surface area of about ½-inch square.

Variations and modifications within the scope of the disclosure and the appended claims can readily be effected by those skilled in the art without departing from the spirit and scope of this invention.

That which is claimed is:

1. In a process for separating a component from a liquid mixture containing at least two components which comprises introducing said mixture into a freezing zone, freezing said mixture in said freezing zone so as to crystallize at least a portion of one of the components of said mixture, passing the resulting slurry of crystals and mother liquor into a filtering zone, withdrawing mother liquor from said filtering zone, passing crystals from said filtering zone to a reflux zone wherein a crystal mass is established, passing crystals from said reflux zone to a melting zone, melting crystals in said melting zone, and withdrawing melt from said melting zone, the improvement which comprises recycling a stream comprising a portion of the melt withdrawn from said melting zone through a heating zone to said reflux zone, establishing a signal representative of the temperature differential between the upstream and downstream portions of said crystal mass in said reflux zone, and controlling the temperature of the stream of said melt recycled to said reflux zone by adjusting the amount of heat applied to said stream in said heating zone responsive to said signal so that as said temperature differential decreases below a predetermined level the amount of heat applied to said stream in said heating zone is increased and as said temperature differential increases above said predetermined level the amount of heat applied to said stream in said heating zone is decreased.

2. The process according to claim 1 further comprises introducing an extraneous fluid into said stream of recycled melt upstream of said heating zone.

3. The process according to claim 1 further comprising compacting said crystals in said reflux zone by applying intermittent mechanical forces thereto.

4. The process according to claim 3 wherein said mechanical force is applied at a plurality of locations in said crystal mass.

5. The process according to claim 3 in which said mixture comprises beer.

6. The process according to claim 3 in which said mixture comprises fruit juice.

7. The process according to claim 3 further comprises introducing an extraneous fluid to said reflux zone.

8. A process which comprises chilling a liquid mixture containing at least two components to crystallize at least a portion of one of the components of said mixture, passing the resulting mixture through a prefilter zone into a filtering zone, removing liquid from said filtering zone, passing crystals and remaining liquid from said filtering zone into a reflux zone wherein a crystal mass is established, passing crystals from said reflux zone into a melting zone, melting a portion of the crystals in said melting zone, withdrawing a portion of the melted crystals from said melting zone, subjecting the remainder of the melted crystals in said melting zone to a pulsating back pressure so that same pass countercurrently to the movement of said crystals into said melting zone, compacting said crystal mass in said reflux zone by applying intermittent mechanical force to the downstream portion thereof, recycling a stream comprising a portion of the said melted crystals withdrawn from said melting zone through a heating zone to said reflux zone, establishing a signal representative of the temperature differential between the upstream and downstream portions of said crystal mass in said reflux zone, and controlling the temperature of said stream of melted crystals recycled to said reflux zone by adjusting the amount of heat applied to said stream in said heating zone responsive to said signal so that as said temperature differential decreases below a predetermined level the amount of heat applied to said stream in said heating zone is increased and as said temperature differential increases above said predetermined level the amount of heat applied to said stream in said heating zone is decreased.

9. The process of claim 8 wherein said recycle material is introduced intermittently.

10. The process of claim 8 wherein said pulsating back pressure and said intermittent recycle introduction are conducted alternatively.

11. The process according to claim 8 further comprising introducing an extraneous fluid into said stream of recycled melted crystals upstream of said heating zone.

12. In an apparatus for the separation and purification of crystals comprising a purification column, means for introducing a slurry containing crystals into one end of said purification column, means for melting said crystals positioned in the opposite end of said purification column, stationary filter means intermediately positioned within said purification column, means for withdrawing liquid from said filter means, a reflux zone being defined by said column between said filter means and said melting means, melt withdrawal means connected to said opposite end of said purification column, and means to move crystals through said purification column towards said melting means, the improvement which comprises a piston, having a plurality of probes extending therefrom and positioned within said purification column, for moving said crystals through said purification column and for compacting said crystals in said reflux zone.

13. The apparatus according to claim 12 further comprising a first conduit means connected between said melt withdrawal means and said reflux zone for recycling a portion of said melt to said reflux zone, heating means disposed in said first conduit means for heating said recycled melt, temperature sensing means in said reflux zone for measuring the temperature differential across the crystal mass in said reflux zone, a temperature control means operatively connected to said temperature sensing means and said heating means for adjusting the amount of heat applied to said recycled mass responsive to the temperature differential across the crystal mass in said reflux zone.

14. The apparatus according to claim 13 further comprising a second conduit means connected to first conduit means upstream of said heating means for introducing an extraneous fluid.

References Cited

UNITED STATES PATENTS

| | | | |
|---|---|---|---|
| 2,891,099 | 6/1959 | Skinner | 62—58 |
| 2,940,272 | 6/1960 | Croley | 62—58 |
| 3,218,818 | 11/1965 | Dale | 62—123 |
| 3,222,880 | 12/1965 | Findlay | 62—123 |
| 3,222,881 | 12/1965 | Moon | 62—58 |
| 3,285,027 | 11/1966 | McKay | 62—58 |

NORMAN YUDKOFF, *Primary Examiner.*

G. P. HINES, *Assistant Examiner.*

UNITED STATES PATENT OFFICE
CERTIFICATE OF CORRECTION

Patent No. 3,357,196 December 12, 1967

Dennis L. Dutcher et al.

It is hereby certified that error appears in the above numbered patent requiring correction and that the said Letters Patent should read as corrected below.

Column 5, lines 43 and 56, for "comprises", each occurrence, read -- comprising --; column 6, line 19, for the claim reference numeral "8" read -- 9 --.

Signed and sealed this 4th day of March 1969.

(SEAL)
Attest:

Edward M. Fletcher, Jr.
Attesting Officer

EDWARD J. BRENNER
Commissioner of Patents